(12) United States Patent
Youngwerth, Jr. et al.

(10) Patent No.: US 8,459,430 B2
(45) Date of Patent: Jun. 11, 2013

(54) AUTOMATIC CLUTCH EMPLOYING EXPANDING FRICTION DISK AND AN ADJUSTABLE PRESSURE PLATE

(76) Inventors: Albert James Youngwerth, Jr., Boise, ID (US); Daniel Scott Youngwerth, Boise, ID (US); Sean Gabriel Brown, Boise, ID (US)

( * ) Notice: Subject to any disclaimer, the term of this patent is extended or adjusted under 35 U.S.C. 154(b) by 526 days.

(21) Appl. No.: 12/412,245

(22) Filed: Mar. 26, 2009

(65) Prior Publication Data
US 2009/0242351 A1 Oct. 1, 2009

Related U.S. Application Data

(60) Provisional application No. 61/040,081, filed on Mar. 27, 2008.

(51) Int. Cl.
*F16D 43/08* (2006.01)
*F16D 13/75* (2006.01)

(52) U.S. Cl.
USPC ............... 192/105 B; 192/70.251; 192/111.6

(58) Field of Classification Search
USPC ............................... 192/105 B, 103 A, 111.6
See application file for complete search history.

(56) References Cited

U.S. PATENT DOCUMENTS

| 3,939,734 | A | | 2/1976 | Blanchette | |
|---|---|---|---|---|---|
| 5,070,984 | A | * | 12/1991 | Fehring | 192/105 B |
| 6,533,056 | B1 | | 3/2003 | Maimone | |
| 7,140,480 | B2 | * | 11/2006 | Drussel et al. | 192/83 |
| 2008/0099300 | A1 | * | 5/2008 | Youngwerth et al. | 192/103 A |

FOREIGN PATENT DOCUMENTS

JP 10-176727 A * 6/1998

* cited by examiner

*Primary Examiner* — Richard M. Lorence (57) ABSTRACT

An apparatus and system are disclosed for automatic centrifugal engagement of a clutch incorporating a friction disk that expands when rotated above a threshold speed. The apparatus may include a clutch basket, a clutch pack capable of coupling the clutch basket with a center clutch, a pressure plate that may be easily adjusted to create a gap between the pressure plate and the clutch pack and an expanding friction disk assembly that may take the place of one or more friction disks. The assembly expands under centrifugal force to provide automatic engagement of the clutch. A mechanism is provided to manually override the automatic engagement of the clutch with a clutch lever and with improved operational performance of the clutch lever versus previous automatic clutch systems.

17 Claims, 11 Drawing Sheets

AUTOMATIC CLUTCH EMPLOYING EXPANDING FRICTION DISK AND AN ADJUSTABLE PRESSURE PLATE

CROSS-REFERENCE TO RELATED APPLICATIONS

This application claims priority to U.S. Provisional Patent Application No. 61/040,081 entitled "AUTOMATIC CLUTCH EMPLOYING EXPANDING FRICTION DISK" and filed on Mar. 27, 2008 which is incorporated herein by reference.

BACKGROUND OF THE INVENTION

This invention relates to a clutch system of the friction type placed in a power transmission system. Typical clutch systems include a clutch input such as a clutch basket, a clutch output such as a center clutch, and one or more plates making up a clutch pack and disposed between the clutch input and clutch output. When the clutch pack is compressed, the clutch input and clutch output become rotationally coupled. More particularly, it is a device for automatically engaging or disengaging a clutch based upon engine speed.

Most motorcycles incorporate a manual transmission coupled to the engine via a multi-plate clutch assembly. Typically, the multi-plate clutch is engaged/disengaged by the driver via a lever mounted on the handlebar. Although the lever operated clutch allows the driver to control the clutch engagement/disengagement, often times motorcycle drivers find the clutch lever difficult to operate smoothly. New riders have difficulty adjusting to smoothly engaging the clutch while operating the throttle to move the vehicle from a standing start. Experienced riders may need to partially disengage the clutch when traveling slowly to allow the engine to continue running without stalling. Motorcycle racers often have a difficult time controlling the engagement of the clutch and the application of the throttle to maximize acceleration. Off-road motorcycle racers often need to stop the rear wheel suddenly with the rear brake, causing the engine to stall if the clutch is not first disengaged. An automatic clutch can help overcome many of the problems associated with a manual clutch.

Automatic clutches for motorcycles have existed for more than 30 years, primarily for entry-level motorcycles with low power. More recently, retrofit automatic clutches for high-performance motorcycles have become available. Automatic clutches for high-performance motorcycles have many advantages over manual clutches. Currently available retrofit automatic clutches have several disadvantages:

Require replacement or changes to existing clutch parts. Most motorcycle clutch's pressure plates are spring loaded and attached to the center clutch. However, the centrifugal mechanism must spin with the clutch's outer basket which is coupled rotationally to the engine to provide clutch engagement force. Many existing retrofit automatic clutches require a modified clutch outer basket to bolt the new centrifugal pressure plate to.

Clutch lever override not possible at high engine speeds. Existing retrofit automatic clutches use a rigid centrifugal engagement mechanism. To disengage the clutch, the entire force of the centrifugal engagement mechanism must be overcome. At higher engine speeds, the increased centrifugal force of the engagement mechanism becomes difficult or impossible to overcome.

Clutch lever override has an inconsistent feel. Existing automatic clutches incorporate a clutch release mechanism that pushes against the centrifugal mechanism to release the clutch engagement. At low engine speeds, centrifugal force is low and the effort to release clutch engagement is low. At higher engine speeds, centrifugal force is high and the effort to release clutch engagement is high. Inconsistent clutch lever effort makes it difficult to effectively control manual override of the automatic clutch over different engine speeds.

Too much centrifugal force at high engine speeds. The stock non-automatic, non-centrifugal pressure plate provides a fixed amount of pressure to the clutch disks. The stock pressure plate force is limited to ensure the clutch can slip if excessive force is sent through the driveline. Existing retrofit automatic clutches transfer all of the force generated by centrifugal engagement mechanism into the clutch disks. At higher engine speeds, the excess centrifugal force can prevent the clutch from slipping in the event an excessive force is sent through the driveline. The excessive force traveling through the clutch may cause a failure in the engine or transmission.

Difficult to install automatic clutch. Most automatic clutches require many or even most of the OEM manual clutch components be replaced with the automatic clutch components. This requires time and cost to install the clutch. Also, it may be desirable for the motorcycle user to be able to switch back and forth between an automatic motorcycle clutch and a manual motorcycle clutch. A need exists for a clutch system that can easily be converted from automatic to manual operation and back again.

Difficult to adjust automatic clutch. Existing automatic clutches require that the gap between the clutch plates and the centrifugal mechanism be maintained to precise tolerances. Adjusting this tolerance may require swapping in different thickness clutch plates or somehow shimming the centrifugal mechanism. Additionally, clutch lever override performance may be optimized by very precisely adjusting the gap between the centrifugal mechanism and clutch plates. A need exists for easily and precisely adjusting the gap between the centrifugal mechanism and the clutch plates.

Adjusting the engine speed at which the clutch begins to engage and how quickly the clutch becomes fully engaged is important for proper operation of an automatic clutch. Existing automatic clutches require changing or shimming springs within the automatic clutch to adjust the engagement speed. Changing or shimming the engagement speed springs typically involves working with small fasteners within the confines of the engine. The operator may drop a small part in the engine requiring significant time and effort to retrieve the dropped piece.

Other automatic clutch solutions exist but all of the prior art fails to address all of the needs described.

DETAILED DESCRIPTION OF THE INVENTION

Reference throughout this specification to "an embodiment," or similar language means that a particular feature, structure, or characteristic described in connection with the embodiment is included in at least one embodiment of the present invention. Thus, appearances of the phrases "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of the embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention provides for a novel automatic clutch solution that maximizes the use of traditional components found in a multi-plate clutch typical of motorcycles and incorporates many new capabilities that allow for easier installation and maintenance of the clutch, improved manual override performance and the ability to quickly change between an automatic clutch and a manual clutch.

To achieve many of the benefits described above, a self-contained, centrifugally actuated, expanding friction disk assembly is disclosed. The expanding friction disk assembly is shaped like and designed to replace one or more friction disks in a multi-plate clutch pack. The expanding friction disk is very simple and compact and is designed to stay together as a single piece during installation and maintenance. It can easily be swapped in or out of the multi-plate clutch pack as a complete assembly. When combined with a pressure plate that includes a means for adjusting its position axially away from or towards the multi-plate clutch pack, forms a system that meets the objectives outlined in the present invention.

Figure 1:
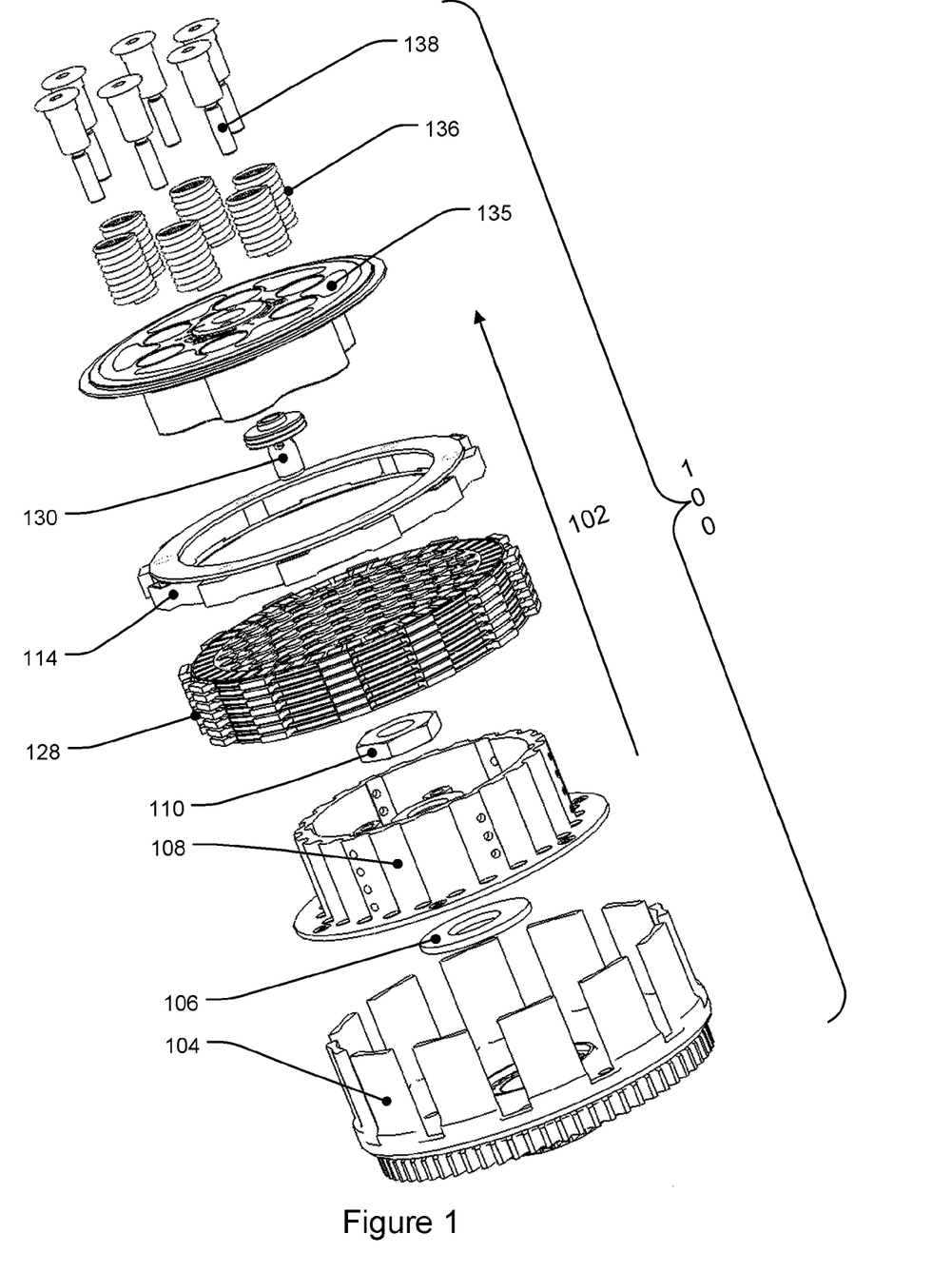
FIG. 1 is an isometric exploded view of a preferred embodiment of the invention.
Figure 2A:
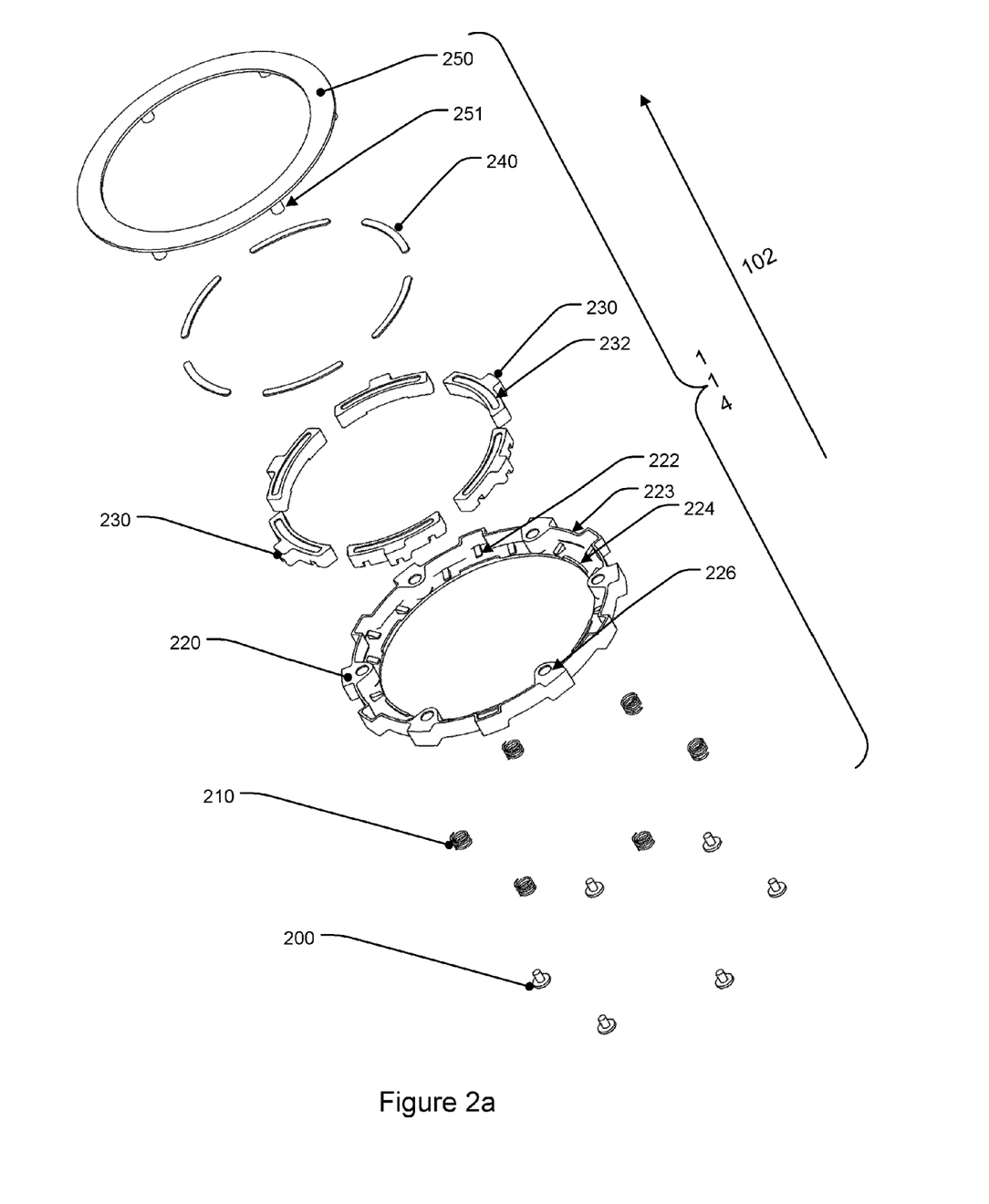
FIG. 2a is an isometric exploded top view of a preferred embodiment of an expanding friction disk assembly.
Figure 2B:
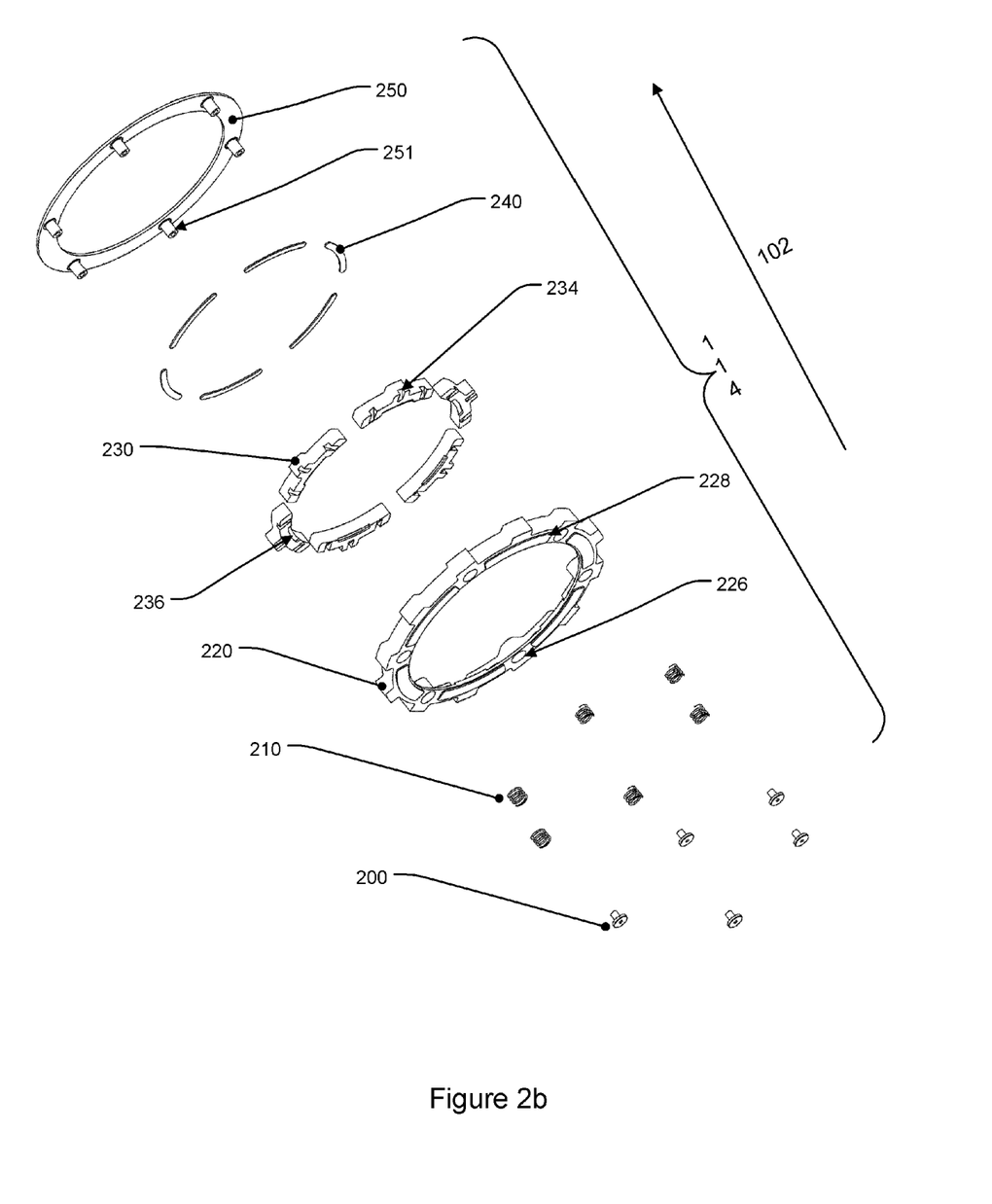
FIG. 2b is an isometric exploded bottom view of a preferred embodiment of an expanding friction disk assembly.
Figure 3A:
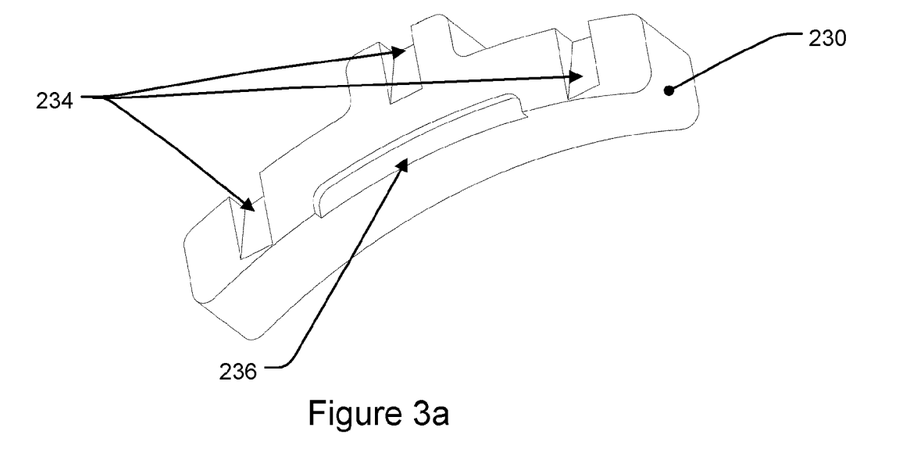
FIG. 3a is a bottom isometric view of a preferred embodiment of a centrifugal wedge, 3b is a top isometric view of a preferred embodiment of a centrifugal wedge.
Figure 3B:
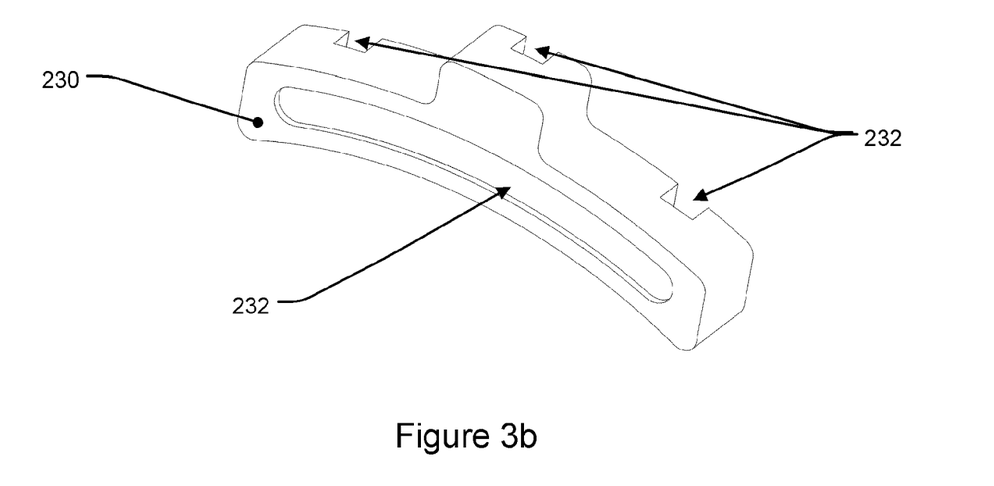

FIG. 1 is an isometric exploded view diagram illustrating an embodiment of a clutch apparatus (hereinafter "clutch") 100 in accordance with the present invention. For clarity purposes, reference will be made to "outward" and "inward" directions. As used herein, the term "outward" refers to a direction pointing away from the clutch basket 104. Arrow 102 illustrates this outward direction. The term "outward direction" may also refer to a radial direction pointing away from a longitudinal axis. As used herein "inward" refers to the opposite direction of "outward."

The clutch 100 is provided with, in one embodiment, a clutch basket 104 having an opening in the center for receiving the transmission input shaft (not shown). Typically the clutch basket 104 is configured with a bearing between the clutch basket 104 and the transmission shaft so that the clutch basket can rotate independently of the transmission shaft with minimal friction. Typically a center clutch thrust washer 106 is disposed between a center clutch 108 and the clutch basket 104. A center clutch nut 110 secures the center clutch 108 against the center clutch thrust washer 106 which in turn is secured against a shoulder on the transmission input shaft (not shown). The center clutch is typically rotationally coupled to the transmission shaft via a suitable spline.

The clutch basket 104 is typically coupled rotationally to a power input source such as an engine and the center clutch 108 is typically coupled rotationally to an output such as a transmission. In another embodiment of the invention, the clutch basket 104 is coupled rotationally to an output and the center clutch 108 is coupled rotationally to a power input.

A clutch pack 128 is disposed between the clutch basket 104 and the center clutch 108. The clutch pack 128 consists of friction plates coupled rotationally to the clutch basket 104 and drive plates interleaved with the friction plates; the drive plates being coupled rotationally with the center clutch 108. When an axial force compresses the clutch pack, friction couples the clutch pack rotationally allowing the clutch basket 104 to turn with the center clutch 108. Consequently when there is no axial force compressing the clutch pack 128, the friction plates are free to rotate independently of the drive plates, allowing the clutch basket 104 to rotate independently of the center clutch 108. In another embodiment of the invention, the clutch pack 128 consists of drive plates coupled rotationally to the clutch basket 104 and friction plates coupled rotationally to center clutch 108.

The configuration of the clutch basket 104, center clutch thrust washer 106, center clutch 108, and center clutch nut 110, clutch pack 128, and the engine and transmission is typical of most modern motorcycle clutches and this structure is commonly employed in many types of power transmission devices.

Next in the outward direction is the expanding friction disk assembly 114. The expanding friction disk assembly's profile is designed to match that of the friction disk in the clutch pack to be rotationally coupled to the clutch basket 104. In another embodiment of the invention the expanding friction disk assembly's profile is designed to match that of the drive plate in the clutch pack to be rotationally coupled to the center clutch 108. In another embodiment of the invention, the expanding friction disk assembly 114 is disposed inwards of the clutch pack 128. In another embodiment of the invention, the expanding friction disk assembly 114 is disposed within the clutch pack 128.

Next in the outward direction is a clutch throw-out 130 and an adjustable pressure plate 135. Springs 136 are disposed into counter-bored holes formed in the pressure plate 135. Bolts 138 having a large diameter head or washer capture the outward edge of the spring, pass through the springs 136 and through the counter-bore of the holes in the pressure plate and are threaded into the center clutch 108. In this configuration, the pressure plate 135 is secured and biased in the inwards direction towards the expanding friction disk assembly 114 by the springs 136.

FIGS. 2a, 2b, 3a, 3b, 4a and 4b detail the structure of a preferred embodiment of an expanding friction disk assembly 114. In a preferred embodiment, the expanding friction disk 114 consists of a top plate 250, anti-friction pads 240, centrifugal wedges 230, a bottom plate 220, biasing springs 210 and fasteners 200.

The centrifugal wedges 230 are shaped substantially like a segment of the friction disk profile to maximize the volume and therefore the mass and centrifugal effect of the centrifugal wedge 230. The centrifugal wedges 230 are formed with a series of ramps 234 on the inward side facing the bottom plate 220. The bottom plate 220 is formed with matching ramps 222 such that when the centrifugal wedge 230 slides radially outward against the ramps 222 of the bottom plate 220, the centrifugal wedge 230 is pushed axially upward away from the bottom plate 220. The bottom plate 220 is also formed with a vertical wall 223 that limits the outward radial movement of the centrifugal wedge 230. The vertical wall 223 and ramps 222 are configured to provide a precise amount of expansion of the expanding friction disk assembly 114. In one embodiment, the expansion is limited to about 0.050". In another embodiment, the expansion is limited to about 0.080".

The centrifugal wedge 230 is also formed with an inward pocket 236. The inward pocket 236 is formed to engage the inward stop 224 formed in the bottom plate 220 such that when the centrifugal wedge 230 slides radially inwards, the inward pocket 236 engages the inward stop 224, preventing the centrifugal wedge 230 from traveling further inward. The inward stop 224 prevents the centrifugal wedges 230 from falling out of the expanding friction disk assembly 114.

In a preferred embodiment, the centrifugal wedge 230 includes pockets 232 to accept an anti-friction material 240 such as Teflon. In this configuration, the anti-friction material rubs against the top plate 250 providing for easier inward and outward radial movement of the centrifugal wedge 230. In another embodiment of the centrifugal wedge 230, no pocket for anti-friction material is provided. In another embodiment an anti-friction coating over the surface of centrifugal wedge 230 is incorporated. In another embodiment a ball bearing or needle bearing is disposed between the centrifugal wedge 230 and the top plate 250 and or bottom plate 220 to reduce friction.

Figure 4A:
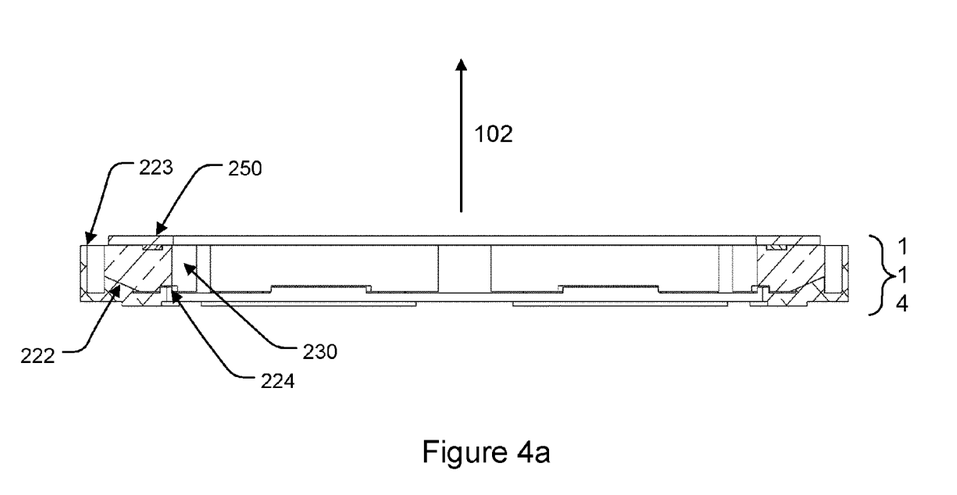
FIG. 4a is a cross-section view of a preferred embodiment of an expanding friction disk assembly detailing the centrifugal wedge and ramps; 4b is a cross-section view of a preferred embodiment of an expanding friction disk assembly detailing a preferred embodiment of a spring biasing structure.
Figure 4B:
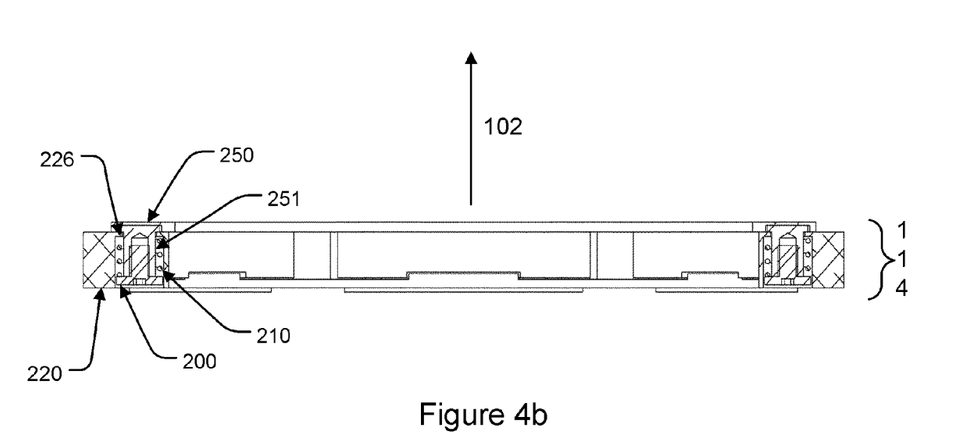

As can be best seen in FIG. 4b, in a preferred embodiment, the bottom plate 220 is formed with counter bored holes 226. The counter-bored holes 226 are configured to receive the internally threaded posts 251 of the top plate 250. A tight fit between the counter-bored holes 226 and the internally threaded posts 251 limit rotational movement between the top plate 250 and the bottom plate 220. Biasing springs 210 are disposed within the counter bored holes 226. Screws 200 capture the inward end of the biasing springs 210, the counter bored holes 226 of the bottom plate 220 capture the outward end of the biasing springs 210. When the screws 200 are threaded into the internally threaded posts 251 of the top plate 250, the biasing springs 210 bias the top plate 250 towards the bottom plate, capturing the centrifugal wedges 230 and anti-friction material 240.

The axial biasing force of the biasing springs 210 through the top plate 250 towards the bottom plate 220 forces the centrifugal wedges 230 down the ramps 222 and radially inwardly up against the inward stop 224 of the bottom plate 220. As the expanding friction disk assembly 114 is rotated around its central vertical axis defined by the outward direction 102, centrifugal forces urge the centrifugal wedges 230 in the radial outward direction against the ramps 222 and the biasing force of the biasing springs 210. When sufficient rotational speed is achieved, the centrifugal force of the centrifugal wedges 230 exceeds the force of the biasing springs 210 and the centrifugal wedges slide out radially against the ramps 222. As the centrifugal wedges slide out radially, the ramps push the wedge vertically away from the bottom plate 220 and force the top plate 250 away from the bottom plate 220 resulting in the entire friction disk assembly 114 expanding.

Typically a biasing spring force is selected that allows the clutch to begin to engage just above engine idle speed. In one embodiment, the spring force selected is about 35 pounds to achieve an engagement speed of approximately 1500 RPMs. In another embodiment a spring force of about 50 pounds is selected to achieve an engagement speed of approximately 2000 RPMs. Selection of an appropriate biasing spring force has many different factors. The primary factors include mass and radius of action of the centrifugal wedges 230, angle of the ramps 222 between the centrifugal wedges 230 and bottom plate 220, gearing between the engine and the clutch, and engine idle speed.

Figure 5A:
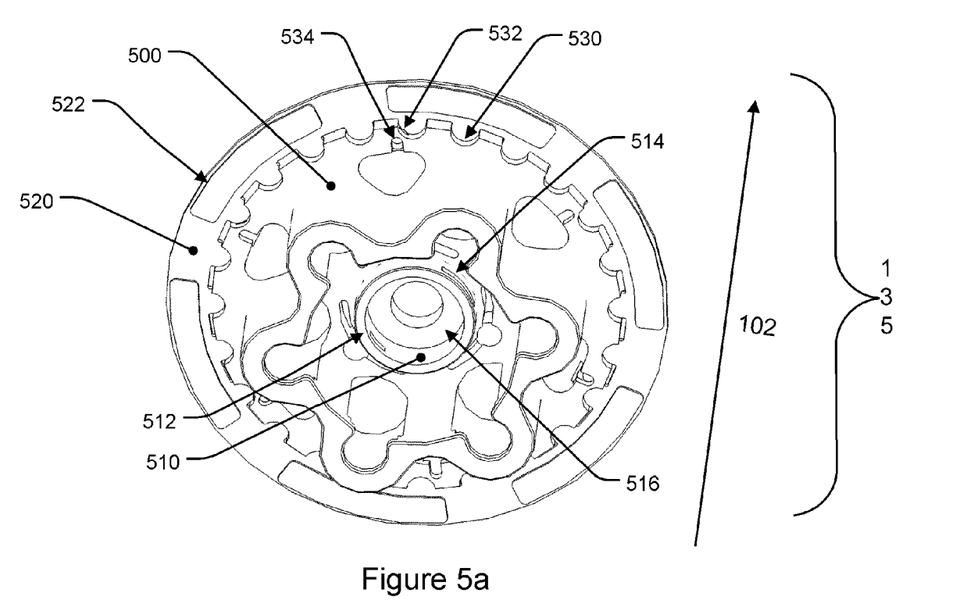
FIG. 5a is an isometric back view of a preferred embodiment of an adjustable pressure plate assembly; 5b is an isometric top view of a preferred embodiment of an adjustable pressure plate assembly.
Figure 5B:
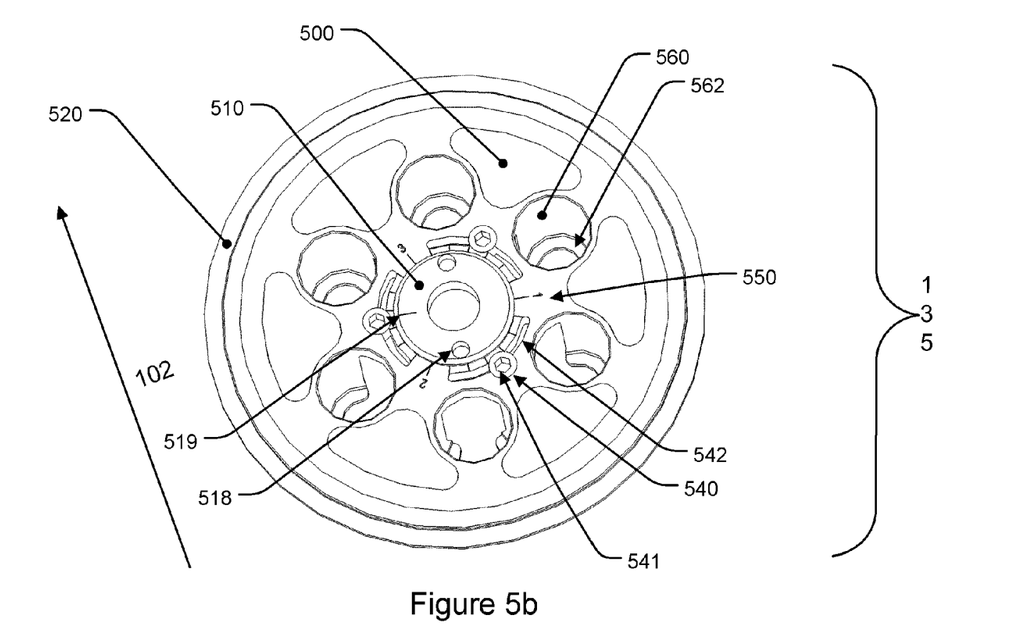

FIGS. 5a and 5b disclose the structure of a preferred embodiment of an adjustable pressure plate assembly 135. As a whole, the adjustable pressure plate assembly 135 is largely of typical construction for a motorcycle clutch. It is formed with counter-bored pockets 560, a hole in the center of the assembly to which a clutch throw-out 130 is journaled and incorporates a surface to axially engage and provide a compressive force to a clutch pack 128. However the adjustable pressure plate assembly also incorporates in a preferred embodiment a threaded pressure plate adjuster 510 that is not of typical construction for a clutch. The threaded pressure plate adjuster 510 is formed on the inward side with a shoulder 512, a throw-out surface 516 and oil flow slots 514. The threaded pressure plate adjuster 510 is formed on the outward side with spanner-wrench holes 518 and a tick mark 519.

A preferred embodiment of the pressure plate 500 incorporates a centrally threaded opening to receive the threaded pressure plate adjuster 510. Around the periphery of the centrally threaded opening are clocking marks 550. The clock marks are useful for tracking the position of the adjustable pressure plate assembly as described more completely below. The pressure plate also incorporates slots 542 and threaded holes 540 to receive tapered set screws 541. When the tapered set screws 541 are threaded into the threaded holes 540, the taper of the tapered set screws 541 creates an expansion force allowing the web of material between the tapered set screws 541 and the slots 542 to expand into the threads of the pressure plate adjuster 510 securing it against rotation.

In a preferred embodiment, the adjustable pressure plate assembly 135 also incorporates a replaceable friction plate 520 having friction pads 522. The replaceable friction disk 520 incorporates a tooth profile 530 to rotationally couple the replaceable friction disk 520 with the pressure plate 500. To keep the replaceable friction disk 520 with the adjustable pressure plate assembly 135, a t-slot 534 extends into the tooth profile 530 of the pressure plate 500 to receive a small belleville washer 532. When the belleville washer 532 is pushed into place, the edge of the belleville washer 532 prevents the replaceable friction disk 520 from separating from the adjustable pressure plate assembly 135.

Figure 6A:
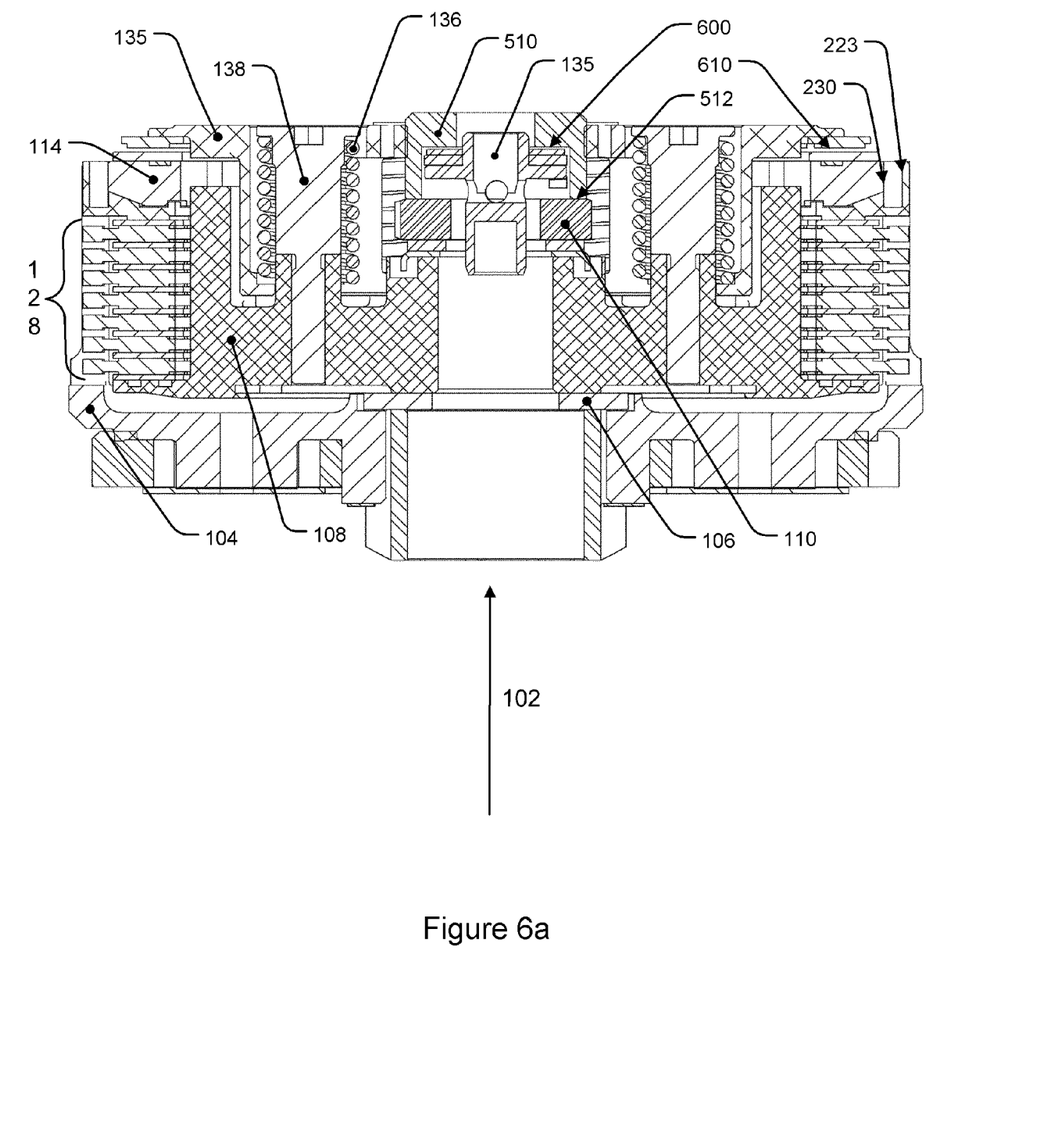
FIG. 6a is cross-section view of a preferred embodiment of the invention in an automatically disengaged state; 6b is cross-section view of a preferred embodiment of the invention in an automatically partially engaged state, 6c is cross-section view of a preferred embodiment of the invention in an automatically fully engaged state.
Figure 6B:
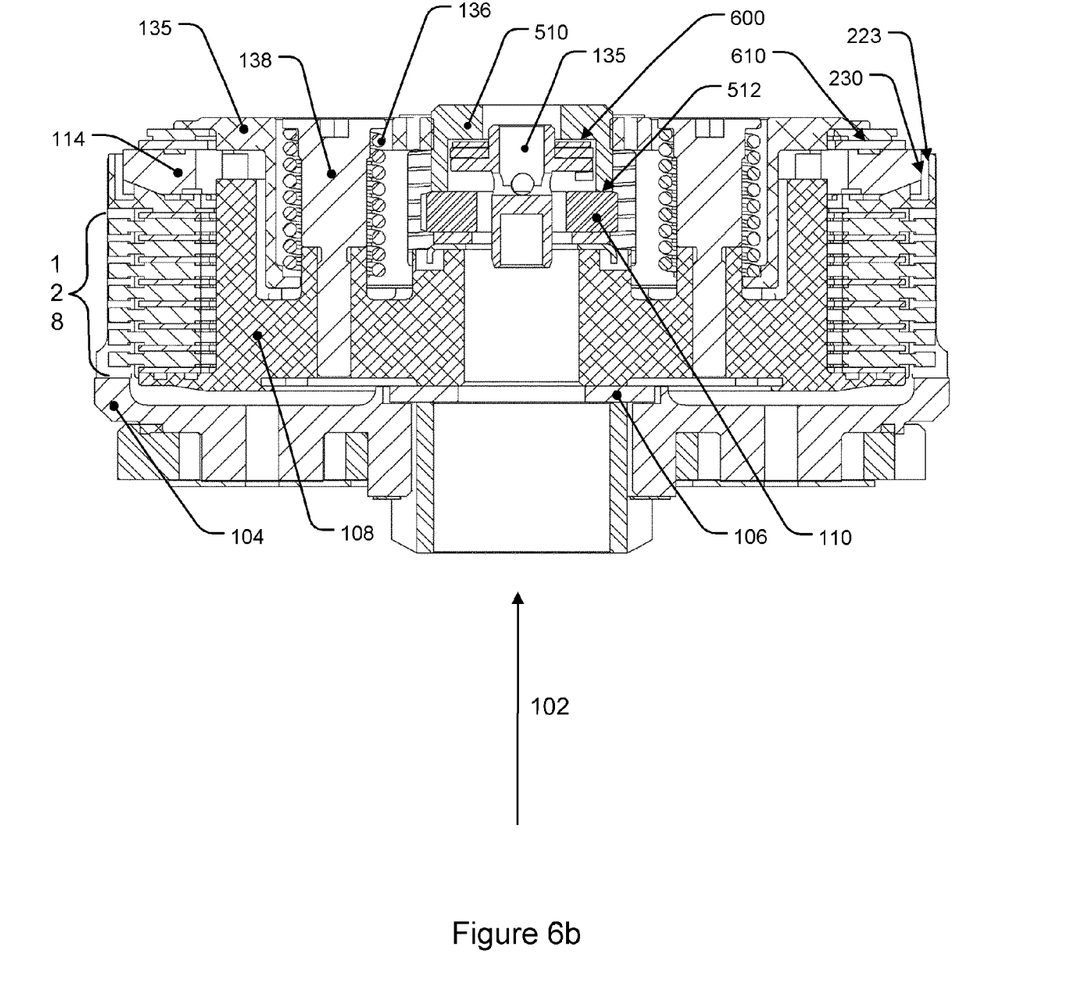
Figure 6C:
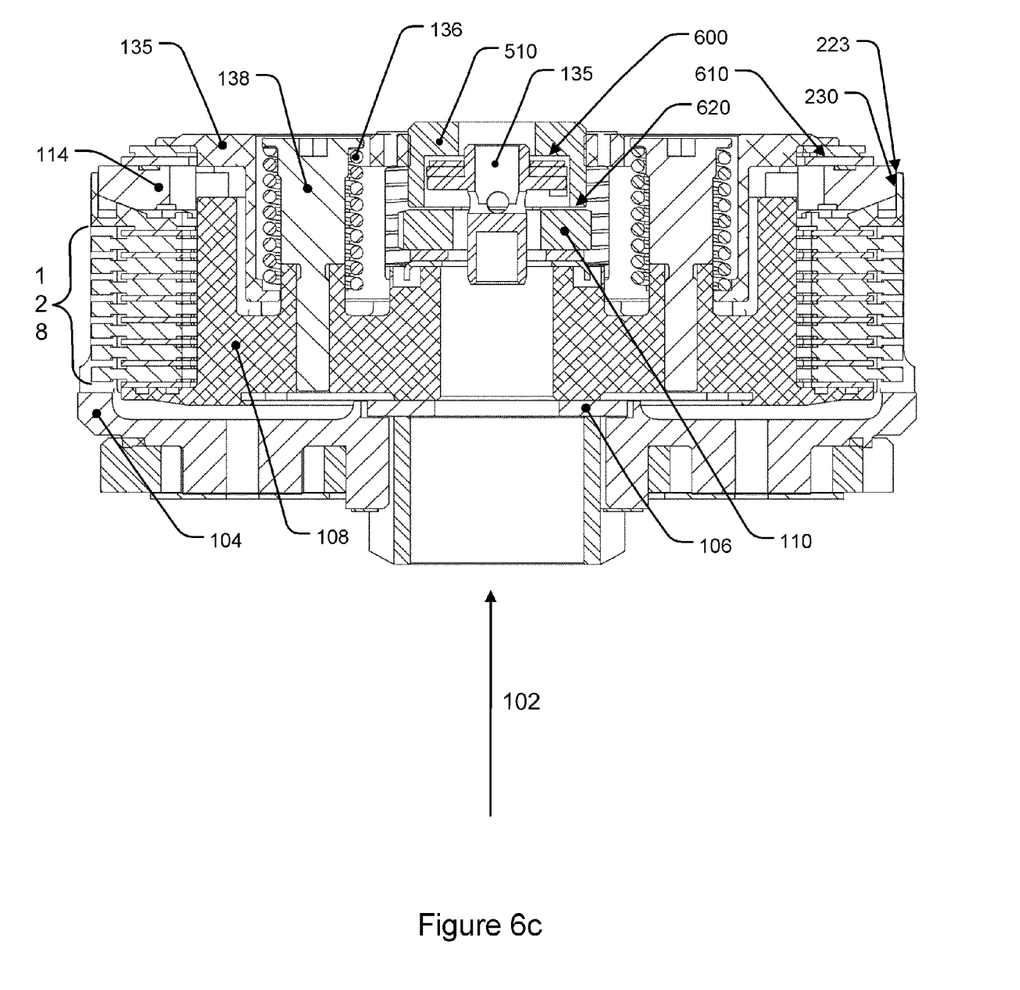

FIGS. 6a, 6b and 6c provide a cross-sectional view of a preferred embodiment of the clutch assembly 100 in different states of operation. The transmission shaft, engine and clutch throw-out rod are not shown but are intended to be of typical construction. FIG. 6a shows the expanding friction disk 114 in its collapsed state. In this figure it is apparent that the threaded pressure plate adjuster 510 has been turned inwards so that the shoulder 512 has engaged the upward surface of the center clutch nut 110. By continuing to turn the threaded pressure plate adjuster 510 inward once the shoulder 512 has made contact with the center clutch nut 110, the adjustable pressure plate assembly 135 is lifted in the upward direction away from the expanding friction disk assembly creating an installed gap 610 between the adjustable pressure plate assembly 135 and the expanding friction disk assembly 114. In another embodiment, any threaded structure that limits the axial distance a pressure plate is biased towards a clutch pack is utilized.

The installed gap 610 allows the clutch assembly 100 to remain disengaged until sufficient engine speed is reached and the expanding friction disk assembly 114 expands axially through the space of the installed gap 610. FIG. 6b shows the expanding friction in a partially expanded state. In FIG. 6b it is apparent that the installed gap 610 is no longer presents as the expanding friction disk assembly has expanded axially through the installed gap and engaged the adjustable pressure plate assembly 135. Initially, the centrifugal wedges 230 of the expanding friction disk assembly 114 must only overcome the biasing springs to begin to expand. However, once the expanding friction disk assembly axially engages the adjustable pressure plate assembly, it must generate enough axial force to overcome the pressure plate springs 136 to expand further.

FIG. 6c shows the expanding friction disk assembly 114 in its fully expanded state. When the centrifugal wedges 230 of the expanding friction disk assembly 114 have generated enough force to overcome the pressure plate springs 136, the centrifugal wedges 230 reach a vertical wall 223 in the bottom plate 220 restricting further expansion of the expanding friction disk assembly 114.

When the installed gap 610 is set properly with the threaded pressure plate adjuster 510 and the expanding friction disk assembly 114 is in its fully expanded state, the entire adjustable pressure plate assembly 135 is lifted off of the center clutch nut 110. As can be seen in FIG. 6c a threaded adjuster gap 620 is formed between the shoulder 512 of threaded pressure plate adjuster 510 and the center clutch nut 110. As the adjustable pressure plate assembly 135 is lifted a small amount, there is also a small increase in the throw-out gap 600. If a threaded adjuster gap 620 is not formed when the expanding friction disk assembly 114 is in its fully expanded state, then some or all of the force of the pressure plate springs 136 is being carried by the shoulder 512 of the threaded pressure plate adjuster 510 and not being transferred into the expanding friction disk assembly 114 and the clutch pack 128. This can cause the clutch 100 to not transfer all of the rotational energy between the input and the output and lead to premature clutch pack 128 wear.

When the installed gap 610 is too big, the expanding friction disk assembly 114 will run out of axial travel and will be unable to lift the adjustable pressure plate assembly 135 sufficiently to create a threaded adjuster gap 620. Alternatively, if the installed gap 610 is too small, the adjustable pressure plate assembly 135 will be lifted a larger amount creating a larger throw-out gap 600. A larger throw-out gap 600 will change the point at which the clutch lever will begin to disengage the clutch; a generally undesirable trait for the operator.

There are many parts that affect the axial distance relationship that is necessary to create the optimal installed gap 610 measurement. Because the axial thickness of these parts may vary by a greater amount than can be tolerated to provide an optimal installed gap 610, the adjustable pressure plate assembly 135 is a necessary and important component in realizing the full benefit of the present invention. The adjustable pressure plate assembly 135 may also be incorporated into other centrifugal clutch systems to improve those clutch systems.

As described previously, the adjustable pressure plate assembly 135 includes clocking marks 550 on the pressure plate 500 and a tick mark 519 on the threaded pressure plate adjuster 510. To set a proper installed gap 610, the operator turns the threaded pressure plate adjuster inwards until significant resistance is felt indicating that the shoulder 512 of the threaded pressure plate adjuster 510 has engaged the outward surface of the center clutch nut 110. Using the tick mark 519 on the threaded pressure plate adjuster 510 and the clock marks 550 on the pressure plate 500, the operator can turn the adjuster inwards the specified number of clock tick marks to achieve the optimal installed gap 610. In one embodiment, the optimal installed gap 610 is achieved by turning the threaded pressure plate adjuster 510 one complete turn plus three clock tick marks. In another embodiment, the optimal installed gap 610 is achieved by turning the threaded pressure plate adjuster 510 one complete turn. Determining the amount of rotation of the threaded pressure plate adjuster 510 necessary for an optimal installed gap 610 is based upon many different factors. Some of the primary factors include the thread pitch of the threaded pressure plate adjuster 510, amount of axial travel available in the expanding friction disk assembly 114 and flex in the adjustable pressure plate assembly 135.

Figure 7:
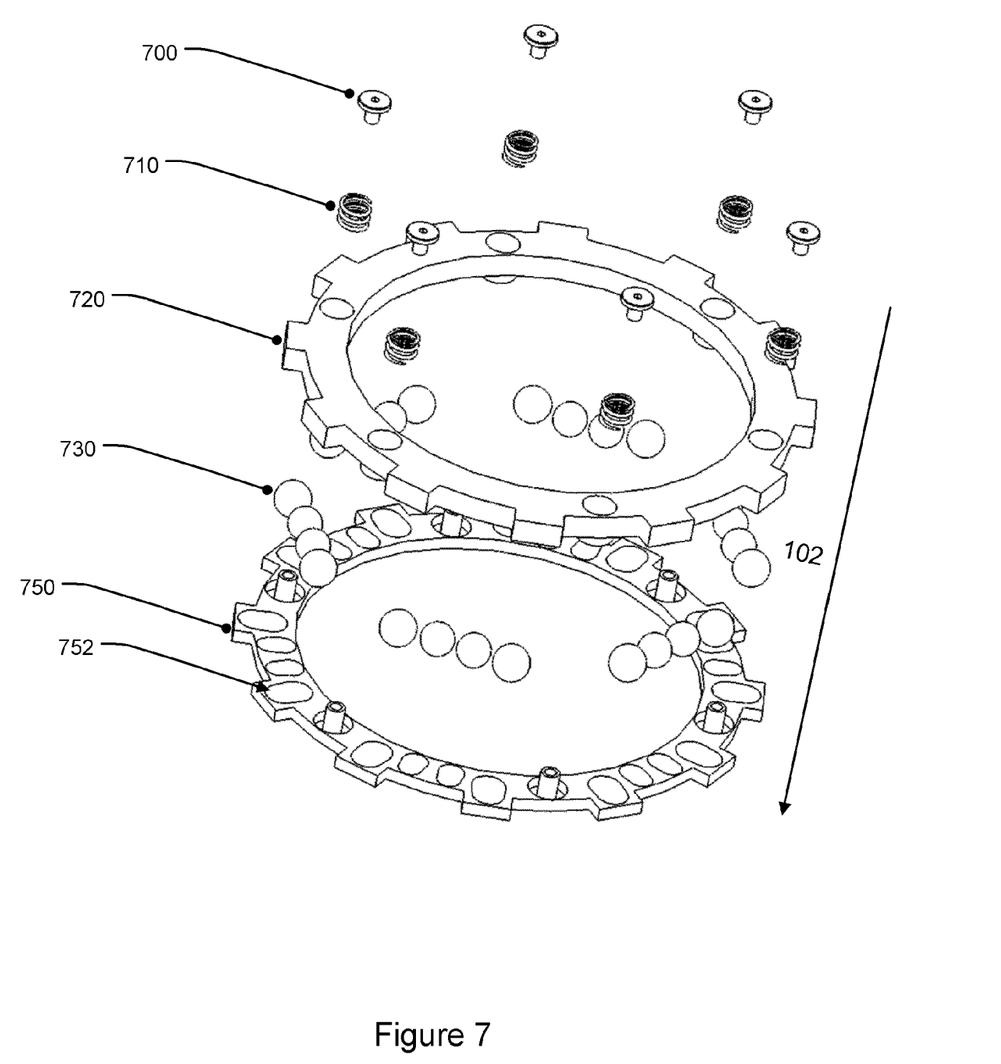
FIG. 7 is an isometric exploded view of a second embodiment of an expanding friction disk assembly.

FIG. 7 discloses a second embodiment of an expanding friction disk assembly 114 utilizing balls for generating centrifugal expansion force. The second embodiment utilizes screws 700, biasing springs 710, a bottom plate 720, centrifugal balls 730, a top plate 750 and grooved ramps 752. The second embodiment disclosed utilizes centrifugal balls 730 in place of centrifugal wedges but is otherwise similar to the preferred embodiment in other relevant structure.

Figure 8:
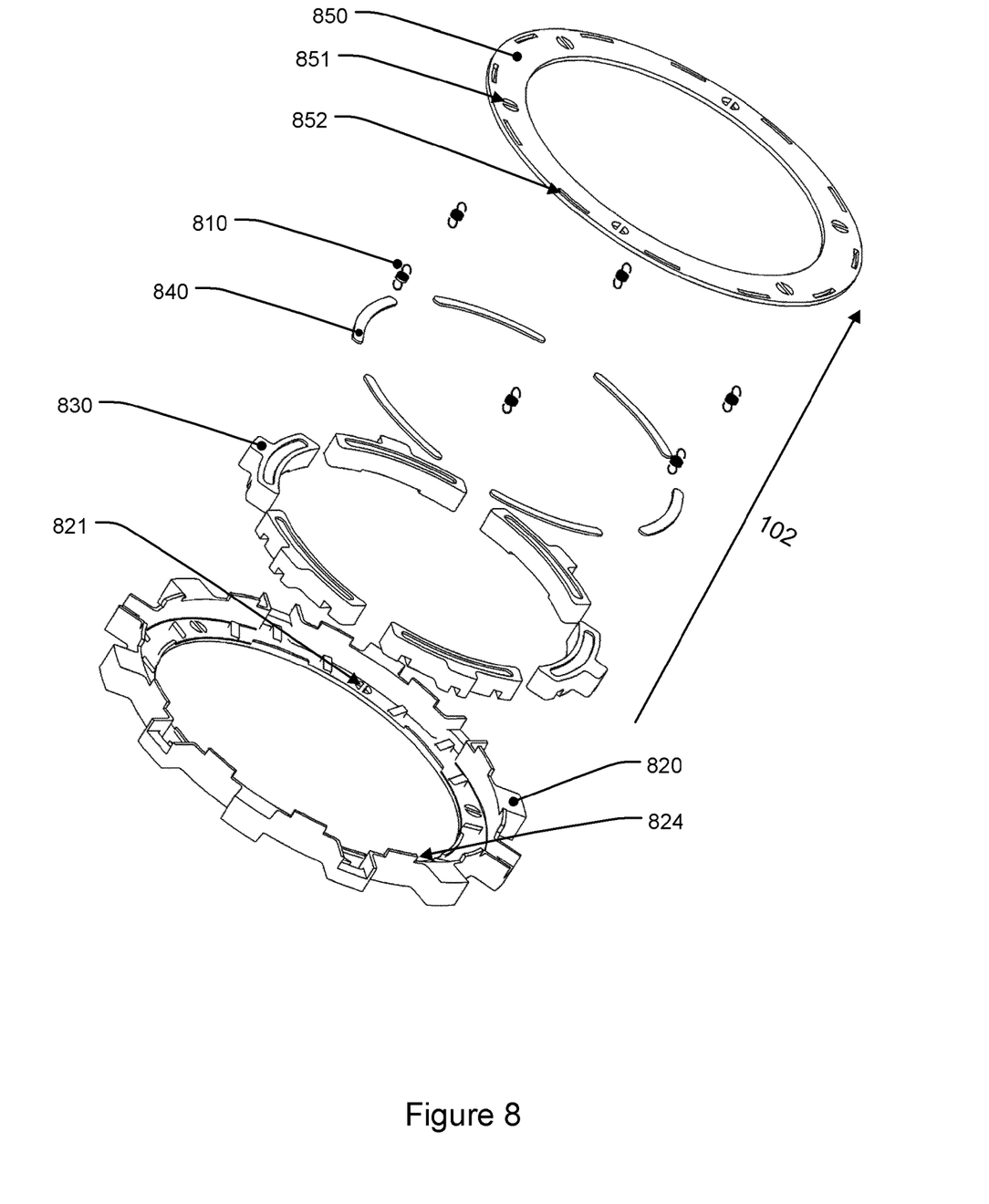
FIG. 8 is an isometric exploded view of a third embodiment of an expanding friction disk assembly.

FIG. 8 discloses a third embodiment of an expanding friction disk assembly 114 utilizing extension springs 810 for biasing the top plate 850 towards the bottom plate 820. The second embodiment utilizes a top plate 850, top plate spring hooks 851, top plate slots 852, extension springs 810, antifriction pads 840, centrifugal wedges 830, a bottom plate 820, bottom plate spring hooks 821, and bottom plate rotational tab stops 824. When assembled, the bottom plate rotational tab stops 824 pass through the top plate slots 852 and limit the rotational movement between the top plate 850 and bottom plate 820. The extension springs 810 hook the top plate spring hooks 851 and the bottom plate spring hooks 821 keeping the assembly together axially and providing a biasing force against the centrifugal force of the centrifugal wedges 830 when the assembly is spinning. The third embodiment disclosed utilizes extension springs 810 for a biasing force and rotational tab stops to limit relative rotation between the bottom plate and top plate but is otherwise similar to the preferred embodiment in other relevant structure.

In a preferred embodiment, the bottom plate 220 of the expanding friction disk assembly 114 is made of aluminum and has friction pads 228 bonded to the inward side and the top plate 250 is formed from steel and has no friction material bonded to it. In this preferred embodiment, the adjustable pressure plate assembly 135 has attached a replaceable friction plate 520. In another embodiment the top plate 250 has friction pads bonded to it and the adjustable pressure plate assembly 135 has no friction pads bonded to it. In another embodiment the bottom plate 220 has no friction material bonded to it.

In another embodiment of the clutch 100, the expanding friction disk assembly 114 is replaced with a static friction disk having the same profile but slightly increased thickness compared to the expanding friction disk assembly 114. The static friction disk is configured so as not to expand under centrifugal force. When the static friction disk is inserted in place of the expanding friction disk assembly 114 and the threaded pressure plate adjuster 510 is turned outward so as not to create an installed gap, the clutch 100 is transformed from an automatically engaging clutch to a manually controlled clutch. In another embodiment of the clutch 100, the expanding friction disk assembly 114 is replaced with a standard thickness friction disk and the adjustable pressure plate assembly 135 is replaced with a manual pressure plate assembly. The manual pressure plate assembly is configured for the lower height of the clutch pack and without a threaded pressure plate adjuster configured to create an installed gap. These alternate embodiments show that another beneficial characteristic of the present invention is the ability to work with standard, non-centrifugal clutch parts and to be quickly and easily converted to and from an automatic centrifugal clutch to a standard manually controlled clutch.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for centrifugal engagement of a clutch comprising: a clutch basket, a pressure plate, a center clutch and a clutch pack disposed between said pressure plate and said center clutch and capable of coupling said clutch basket with said center clutch; an expanding friction disk assembly disposed between said center clutch and said pressure plate, said expanding friction disk assembly having a first plate, a second plate, at least one centrifugal actuating member disposed between said first plate and said second plate, at least one ramping mechanism disposed between said centrifugal actuating member and said first plate and at least one biasing spring disposed between said first plate and said second plate; wherein said biasing spring provides a force to urge said first plate and said second plate towards each other and wherein when said expanding friction disk assembly is rotated above a threshold speed, said centrifugal actuating member moves radially outward against the force of said biasing spring and said ramping mechanism causing said expanding friction disk assembly to expand.

2. The expanding friction disk apparatus of claim 1 wherein said first plate includes at least one counter-bored pocket to receive said biasing spring, said second plate includes at least one post configured to pass through said counter-bored pocket and at least one fastener wherein said fastener couples one end of said biasing spring to said post and the opposite end of said biasing spring is coupled to said counter bore.

3. The expanding friction disk apparatus of claim 1 wherein said biasing spring is an extension spring and said first plate includes at least one anchor point for one end of said extension spring and said second plate includes at least one anchor point for the opposite end of said extension spring and wherein at least one first rotational stop is formed in said first plate and at least one second rotational stop is formed in said second plate and configured such that said first rotational stop and said second rotational stop limit the relative rotational movement between said first plate and said second plate.

4. The expanding friction disk apparatus of claim 1 further comprising a clutch pack and wherein said centrifugal actuating member is shaped substantially arcuately to maximize the volume of the centrifugal actuating member and said ramping mechanism is formed on at least one side of said centrifugal actuating member to engage ramps formed on at least said first plate.

5. The expanding friction disk apparatus of claim 1 wherein an anti-friction means is disposed between said centrifugal actuating member and at least one of said first plate or said second plate to reduce the sliding friction of said centrifugal actuating member during outward radial movement of said centrifugal actuating member.

6. A centrifugal clutch system comprising: at least one biasing spring, a center clutch, a clutch pack and an adjustable pressure plate assembly, said adjustable pressure plate assembly including a pressure plate and a threaded adjuster; wherein said biasing spring provides a force to urge said pressure plate in a direction towards said clutch pack and said threaded adjuster provides an adjustable stop for limiting the movement of said pressure plate towards said clutch pack against the force of said biasing spring.

7. The centrifugal clutch system of claim 6 further comprising a centrifugal force mechanism in expanding communication with said clutch pack and wherein said threaded adjuster is configured to prevent said pressure plate from axially compressing said clutch pack and wherein below a threshold speed of rotation of said centrifugal force mechanism, said centrifugal force mechanism remains in a collapsed state preventing said clutch pack from being axially compressed by said pressure plate and above said threshold speed of rotation of said centrifugal force mechanism, said centrifugal force mechanism is in an expanded stated causing said clutch pack to be compressed by said pressure plate.

8. The centrifugal clutch system of claim 7 wherein said centrifugal force mechanism is comprised of: a first plate, a second plate, at least one centrifugal actuating member disposed between said first plate and said second plate, at least one ramping mechanism disposed between said centrifugal actuating member and said first plate and at least one biasing spring disposed between said first plate and said second plate; wherein said biasing spring provides a force to urge said first plate and said second plate towards each other.

9. The centrifugal clutch system of claim 8 wherein said first plate includes at least one counter-bored pocket to receive said biasing spring, said second plate includes at least one post configured to pass through said counter-bored pocket and at least one fastener wherein said fastener couples one end of said biasing spring to said post and the opposite end of said biasing spring is coupled to said counter bore.

10. The centrifugal clutch system of claim 8 wherein said biasing spring is an extension spring and said first plate includes at least one anchor point for one end of said extension spring and the top plate includes at least one anchor point for the opposite end of said extension spring and wherein at least one first rotational stop is formed in said first plate and at least one second rotational stop is formed in said second plate and configured such that said first rotational stop and said second rotational stop limit the relative rotational movement between said first plate and said second plate.

11. The centrifugal clutch system of claim 8 wherein said centrifugal actuating member is shaped substantially arcuately to maximize the volume of the centrifugal actuating member and said ramping mechanism is formed on at least one side of said centrifugal actuating member to engage ramps formed on at least said first plate.

12. The centrifugal clutch system of claim 8 wherein an anti-friction means is disposed between said centrifugal actuating member and at least one of said first plate or said second plate to reduce the sliding friction of said centrifugal actuating member during outward radial movement of said centrifugal actuating member.

13. An automatic clutch apparatus comprising: a clutch input, a clutch output, an adjustable pressure plate assembly, an expanding friction disk assembly rotationally coupled to said clutch input and including a first plate, a second plate, at least one centrifugal actuating member disposed between said first plate and said second plate, at least one ramping mechanism disposed between said centrifugal actuating member and said first plate and at least one biasing spring disposed between said first plate and said second plate; wherein said biasing spring provides a force to urge said first plate and said second plate towards each other; a clutch pack disposed between said clutch output and said adjustable pressure plate assembly, said clutch pack capable of frictional rotational coupling of said clutch input to said clutch output; said clutch pack including at least one of said expanding friction disk assemblies; said adjustable pressure plate assembly including at least one pressure plate biasing spring, a pressure plate and a threaded adjuster; wherein said pressure plate biasing spring provides a force to urge said pressure plate in a direction towards said clutch pack and said threaded adjuster provides an adjustable stop for limiting the movement of said pressure plate towards said clutch pack against the force of said pressure plate biasing spring and creating a gap between said pressure plate and said clutch pack; wherein below a threshold speed of rotation of said clutch input, said expanding friction disk assembly remains in a collapsed state and above said threshold speed of rotation of said clutch input, said expanding friction disk assembly expands through said gap and provides an axial force against said adjustable pressure plate causing frictional coupling of said clutch pack and rotationally coupling said clutch input to said clutch output.

14. The automatic clutch apparatus of claim 13 wherein said first plate includes at least one counter-bored pocket to receive said biasing spring, said second plate includes at least one post configured to pass through said counter-bored pocket and at least one fastener wherein said fastener couples one end of said biasing spring to said post and the opposite end of said biasing spring is coupled to said counter bore.

15. The automatic clutch apparatus of claim 13 wherein said biasing spring is an extension spring and said first plate includes at least one anchor point for one end of said extension spring and the top plate includes at least one anchor point for the opposite end of said extension spring and wherein at least one first rotational stop is formed in said first plate and at least one second rotational stop is formed in said second plate and configured such that said first rotational stop and said second rotational stop limit the relative rotational movement between said first plate and said second plate.

16. The automatic clutch apparatus of claim 13 wherein said centrifugal actuating member is shaped substantially arcuately to maximize the volume of the centrifugal actuating member and said ramping mechanism is formed on at least one side of said centrifugal actuating member to engage ramps formed on at least said first plate.

17. The automatic clutch apparatus of claim 13 wherein an anti-friction means is disposed between said centrifugal actuating member and at least one of said first plate or said second plate to reduce the sliding friction of said centrifugal actuating member during outward radial movement of said centrifugal actuating member.

\* \* \* \* \*